(12) United States Patent
Powers et al.

(10) Patent No.: US 10,863,558 B2
(45) Date of Patent: Dec. 8, 2020

(54) COMMUNICATION DEVICE FOR IMPLEMENTING TRUSTED RELATIONSHIPS IN A SOFTWARE DEFINED NETWORK

(71) Applicant: Schweitzer Engineering Laboratories, Inc., Pullman, WA (US)

(72) Inventors: Josh Powers, Pullman, WA (US); Tristan Lloyd Mullis, Pullman, WA (US); Jason A. Dearien, Moscow, ID (US); Michael Dylan Cone, Pullman, WA (US); Coby Soss, Pullman, WA (US); Barry Jakob Grussling, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 888 days.

(21) Appl. No.: 15/085,869

(22) Filed: Mar. 30, 2016

(65) Prior Publication Data
US 2017/0289117 A1 Oct. 5, 2017

(51) Int. Cl.
*H04W 76/11* (2018.01)
*H04W 8/00* (2009.01)
(Continued)

(52) U.S. Cl.
CPC .......... *H04W 76/11* (2018.02); *H04L 9/3263* (2013.01); *H04L 41/00* (2013.01); *H04L 63/0823* (2013.01); *H04W 8/005* (2013.01)

(58) Field of Classification Search
CPC .... H04L 63/08; H04L 64/0823; H04W 8/005; H04W 76/021
(Continued)

(56) References Cited

U.S. PATENT DOCUMENTS

| 6,747,957 B1 | 6/2004 | Pithawala |
| 7,218,632 B1 | 5/2007 | Bechtolsheim |

(Continued)

FOREIGN PATENT DOCUMENTS

| EP | 2765751 | 8/2014 |
| KR | 20150051107 | 5/2015 |

(Continued)

OTHER PUBLICATIONS

PCT/US2016/038139 Patent Cooperation Treaty, International Search Report and Written Opinion of the International Searching Authority, dated Sep. 9, 2016.
(Continued)

*Primary Examiner* — Farid Homayounmehr
*Assistant Examiner* — Thanh T Le
(74) *Attorney, Agent, or Firm* — Jared L. Cherry; Bradley W. Schield

(57) ABSTRACT

The present disclosure pertains to systems and methods for establishing trust relationships between a software defined network (SDN) controller and a SDN communication device. In one embodiment, a SDN controller may comprise a communications interface configured to communicate with a plurality of SDN network devices. A commissioning subsystem configured to detect a new device associated with the SDN. In response to a new device, a user interface subsystem may be configured to receive a user approval to commission the new device. A trust subsystem configured to establish a first SDN controller trusted credential and to transmit a first device trusted credential based on the first SDN controller credential to the new device. Programming instructions to the new device authenticated using the first SDN controller trusted credential by a SDN programming subsystem.

20 Claims, 6 Drawing Sheets

(51) Int. Cl.
  *H04L 9/32* (2006.01)
  *H04L 29/06* (2006.01)
  *H04L 12/24* (2006.01)
(58) Field of Classification Search
  USPC .......................................................... 713/156
  See application file for complete search history.

(56) References Cited

U.S. PATENT DOCUMENTS

| | | | |
|---|---|---|---|
| 7,266,849 B1* | 9/2007 | Gregory | G06F 21/575 |
| | | | 713/193 |
| 7,376,831 B2 | 5/2008 | Kollmyer | |
| 7,872,983 B2 | 1/2011 | Lai | |
| 8,347,079 B2* | 1/2013 | Cho | H04L 9/3242 |
| | | | 713/156 |
| 8,520,670 B1* | 8/2013 | Giniger | H04L 63/0272 |
| | | | 370/389 |
| 8,553,544 B2 | 10/2013 | Lai | |
| 8,800,044 B2 | 8/2014 | Raad | |
| 8,989,380 B1* | 3/2015 | Belser | H04L 63/0823 |
| | | | 380/270 |
| 9,038,151 B1* | 5/2015 | Chua | H04L 63/02 |
| | | | 726/6 |
| 9,237,129 B2 | 1/2016 | Ling | |
| 9,286,171 B2 | 3/2016 | Cardona | |
| 9,432,255 B1 | 8/2016 | Hasan | |
| 9,432,380 B2 | 8/2016 | Margalit | |
| 9,680,588 B2 | 6/2017 | Connolly | |
| 9,686,125 B2 | 6/2017 | Smith | |
| 9,760,504 B2* | 9/2017 | Chinnakkonda Vidyapoornachary | G06F 3/0622 |
| 9,769,060 B2 | 9/2017 | Dearien | |
| 2002/0023217 A1* | 2/2002 | Wheeler | G06Q 20/02 |
| | | | 713/171 |
| 2002/0172157 A1 | 11/2002 | Rhodes | |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2007/0143838 A1* | 6/2007 | Milligan | H04L 63/062 |
| | | | 726/15 |
| 2007/0217344 A1* | 9/2007 | Krywaniuk | H04L 63/061 |
| | | | 370/254 |
| 2008/0005558 A1 | 1/2008 | Hadley | |
| 2008/0080384 A1 | 4/2008 | Atkins | |
| 2008/0184030 A1* | 7/2008 | Kelly | H04L 9/3268 |
| | | | 713/156 |
| 2008/0204248 A1* | 8/2008 | Cam Winget | H04W 8/245 |
| | | | 340/572.4 |
| 2009/0252309 A1* | 10/2009 | Beyer | H04L 63/0442 |
| | | | 379/93.02 |
| 2009/0257743 A1 | 10/2009 | Chung | |
| 2009/0265470 A1* | 10/2009 | Shen | H04W 12/003 |
| | | | 709/227 |
| 2009/0285093 A1 | 11/2009 | Bolt | |
| 2009/0313189 A1 | 12/2009 | Sun | |
| 2010/0241608 A1 | 9/2010 | Huang | |
| 2011/0085567 A1 | 4/2011 | Beecroft | |
| 2011/0087952 A1 | 4/2011 | Marin | |
| 2013/0035066 A1* | 2/2013 | Nylander | H04W 4/70 |
| | | | 455/411 |
| 2013/0067552 A1* | 3/2013 | Hawkes | H04L 63/0876 |
| | | | 726/7 |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0227646 A1* | 8/2013 | Haggerty | H04L 63/06 |
| | | | 726/3 |
| 2013/0250770 A1 | 9/2013 | Zou | |
| 2013/0263247 A1 | 10/2013 | Jungck | |
| 2013/0290735 A1* | 10/2013 | Rombouts | G06F 21/33 |
| | | | 713/189 |
| 2013/0294228 A1 | 11/2013 | Ahuja | |
| 2014/0025945 A1 | 1/2014 | McGrew | |
| 2014/0029451 A1 | 1/2014 | Nguyen | |
| 2014/0064100 A1 | 3/2014 | Edwards et al. | |
| 2014/0112130 A1 | 4/2014 | Yang et al. | |
| 2014/0115706 A1 | 4/2014 | Silva et al. | |
| 2014/0129700 A1 | 5/2014 | Mehta | |
| 2014/0153572 A1 | 6/2014 | Hampel | |
| 2014/0160939 A1 | 6/2014 | Arad | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0325038 A1 | 10/2014 | Kis | |
| 2014/0325649 A1 | 10/2014 | Zhang | |
| 2014/0371941 A1 | 12/2014 | Keller et al. | |
| 2014/0376406 A1 | 12/2014 | Kim | |
| 2015/0081762 A1 | 3/2015 | Mason et al. | |
| 2015/0112933 A1 | 4/2015 | Satapathy | |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142427 A1 | 5/2016 | de los Reys | |
| 2016/0165454 A1 | 6/2016 | Li | |
| 2016/0277195 A1* | 9/2016 | Maeda | H04L 9/3297 |
| 2016/0330076 A1 | 11/2016 | Tiwari | |
| 2016/0337247 A1 | 11/2016 | Yao | |
| 2016/0344592 A1 | 11/2016 | Cook | |
| 2016/0359629 A1* | 12/2016 | Nadathur | H04W 12/0013 |
| 2017/0026187 A1* | 1/2017 | Ramatchandirane | H04L 63/0876 |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0201488 A1* | 7/2017 | Krywaniuk | H04L 63/0442 |
| 2017/0302656 A1* | 10/2017 | Ramatchandirane | H04L 63/166 |
| 2017/0346630 A1* | 11/2017 | Nadathur | H04L 12/6418 |
| 2018/0027405 A1* | 1/2018 | Holtmanns | H04W 12/0403 |
| | | | 455/558 |

FOREIGN PATENT DOCUMENTS

| | | | | |
|---|---|---|---|---|
| WO | WO 2011133912 A2 * | 10/2011 | ......... | H04L 63/0823 |
| WO | WO-2011133912 A2 * | 10/2011 | ......... | H04L 63/0823 |
| WO | 2015038040 | 3/2015 | | |

OTHER PUBLICATIONS

PCT/US2016/038419 Patent Cooperation Treaty, International Search Report and Written Opinion of the International Searching Authority, dated Aug. 30, 2016.
PCT/US2016/039582 Patent Cooperation Treaty, International Search Report and Written Opinion of the International Searching Authority, dated Feb. 8, 2017.
PCT/US2016/039081 Patent Cooperation Treaty, International Search Report and Written Opinion of the International Searching Authority, dated Sep. 8, 2016.
PCT/US2016/039079 Patent Cooperation Treaty, International Search Report and Written Opinion of the International Searching Authority, dated Oct. 12, 2016.
Braun, Wolfgang, Menth, Michael, Software-Defined Networking Using OpenFlow: Protocols, Applications and Architectural Design Choices, Future Internet, May 12, 2014.

(56) References Cited

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

\* cited by examiner

COMMUNICATION DEVICE FOR IMPLEMENTING TRUSTED RELATIONSHIPS IN A SOFTWARE DEFINED NETWORK

TECHNICAL FIELD

The present disclosure pertains to systems and methods for improving security in a software defined network ("SDN") by establishing cryptographic trust between a SDN controller and a plurality of devices in a SDN.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
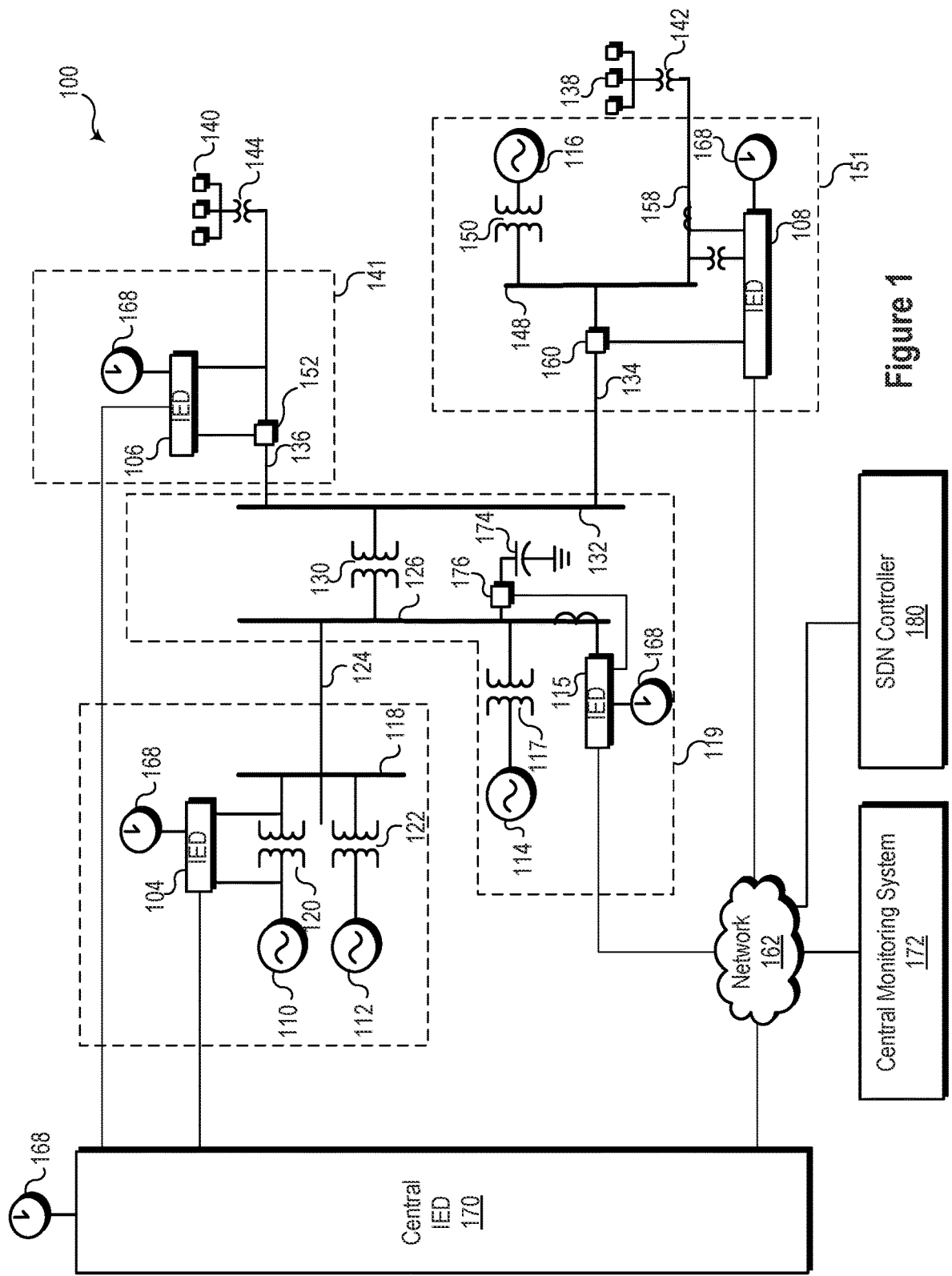
FIG. 1 illustrates a simplified one-line diagram of an electric power transmission and distribution system in which a plurality of communication devices may facilitate communication in a software defined network consistent with embodiments of the present disclosure.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information necessary for the proper assessment of power system conditions and for implementing control actions based on such conditions. In addition, such messages may be subject to time constraints because of the potential for rapid changes in conditions in an electric power transmission and distribution system.

Security is an increasingly significant concern in connection with critical infrastructure, such as electric power distribution and transmission systems. Electric power systems have increasingly becoming targets of cyberattacks. Due to the fact that electric power distribution and transmission systems may cover large areas, it may be necessary to transmit data over long distances. Such data should be protected from interception (e.g., using physical security and data security), however, concerns about security must be balanced against the functional requirements of the electric power transmission and distribution system, and the configuration burden imposed on the operators of the system.

Some electric power transmission and distribution systems may incorporate software defined network ("SDN") networking technologies that utilize a controller to regulate communications on the network. SDN networking technologies offer a variety of advantages that are advantageous in electric power systems (e.g., deny-by-default security, latency guarantees, deterministic transport capabilities, redundancy and fail over planning, etc.). Embodiments consistent with the present disclosure may further increase security by automating establishment of trusted relationships within a SDN. The systems and methods disclosed herein may permit establishing and maintenance of trusted relationships with minimal configuration burdens on a user responsible for operation of the electric power transmission and distribution system.

A SDN allows a programmatic change control platform, which allows an entire communication network to be managed as a single asset, simplifies the understanding of the network, and enables continuous monitoring of a network. In a SDN, the systems that decide where the traffic is sent (i.e., the control plane) are separated from the systems that perform the forwarding of the traffic in the network (i.e., the data plane). In SDN networks, controllers establish data flows among devices in the data plane.

The control plane may be used to achieve the optimal usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

In a SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in a SDN consists of relatively simple packet forwarding devices with a communications interface to the controller to receive forwarding information. In addition to simplifying management of a network, a SDN architecture may also enable monitoring and troubleshooting features that may be beneficial for use in an electric power distribution system, including but not limited to: mirroring a data selected flow rather mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

Maintaining security within a SDN is enhanced by ensuring that a controller communicates only with trusted devices. A rogue device within a SDN may undermine the security of the network by forwarding data to other unauthorized devices and/or users. Accordingly various embodiments consistent with the present disclosure may be configured to establish trust between a SDN Controllers and a plurality of devices in a SDN data plane. Such trusted relationships may enable secure commutations within the device (e.g., by encrypting communications) and may prevent unauthorized changes to data flows within the network. In various embodiments a SDN controller may act as a trusted authority and may issue trusted credentials to various devices. In some embodiments, a SDN controller may implement a public key infrastructure ("PKI"). Alternate security policies may be used in other embodiments.

A SDN controller consistent with the present disclosure may act as a trusted authority for devices in a SDN. In such embodiments, the SDN controller may issue trusted credentials to internal components that communicate with devices in the data plane. When a new device is added to a SDN, the new device may initiate communication with the SDN controller. In various embodiments consistent with the present disclosure, the identity of the new device may be verified by an operator before the SDN controller communicates with the new device. Upon confirmation from a user that the new device is a trusted device, the new device may be admitted to the network and may be programmed by the SDN controller to transmit data on the network. The trusted authority may issue trusted credentials to the new device to maintain the security of data communications handled by the new device. Further, the new device may be programmed to require certain trusted credentials before accepting changes to data flows handled by the new device. As such, the device may be resistant to unauthorized programming changes.

Trusted credentials may be generated and issued to appropriate electronic control units that meet one or more trust requirements. In some embodiments, the trust requirements may comprise software and/or hardware requirements (e.g., secure software and/or secure hardware requirements). Trusted credentials may comprise, without limitation, one or more trusted digital certificates (e.g., X.509 certificates), cryptographic keys, and/or any other indicia of trust configured to facilitate trusted communication between vehicle control units and/or associated systems and devices. In various embodiments Transport Layer Security (TLS) connections may be used for issuing trusted credentials.

In some embodiments, a trusted authority may maintain two or more signing certificates. In such embodiments, a primary certificate may be used for typical operation. In the event that the primary certificate is compromised, the SDN controller may utilize one or more secondary signing certificates, together with the teachings of the present disclosure to reestablish trusted relationships in the SDN. In some embodiments, in the event that a primary signing certificate is compromised, data communications may continue uninterrupted, but programming operations within the network may be suspended until new trusted credentials are issued.

In some embodiments, trusted credentials may be revoked by a trusted authority in various circumstances. In one specific circumstance, replacement of a device in the data plane (e.g., as a result of the end of the device's life), may cause the trusted credentials of the device to be revoked. Accordingly, if a switch that was once a part of a network is later reconnected to the network, the credentials associated with the device may no longer allow the device to gain access to the network. In some embodiments, removal of a device from the network may be confirmed by an operator. In other circumstances, the trusted credentials may be revoked if a device is disconnected from the network for a specified period of time.

Embodiments consistent with the present disclosure may be utilized in a variety of communication devices. A communication device, as the term is used herein, is any device that is capable of accepting and forwarding data traffic in a data communication network. In addition to the functionality of accepting and forwarding data traffic, communication devices may also perform a wide variety of other functions and may range from simple to complex devices.

A variety of cryptographic techniques and algorithms may be utilized in connection with systems and methods consistent with the present disclosure. Such techniques and algorithms may include Data Encryption Standard (DES), Advanced Encryption Standard (AES), International Data Encryption Algorithm (IDEA), RSA, Diffie-Hellman, etc. Still further, in some embodiments, various encryption techniques may be used for confirming the identity of a transmitting device.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates an embodiment of a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

A SDN controller 180 may be configured to interface with equipment in network 162 to create a SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

SDN controller 180 may act as a trusted authority for various devices connected to network 162. Accordingly, SDN controller 180 may be configured to issue trusted credentials to IEDs 108, 115, and 170. The trusted credentials may be used by these devices to encrypt data transmitted through network 162 and/or to verify the identity of such devices.

Figure 2:
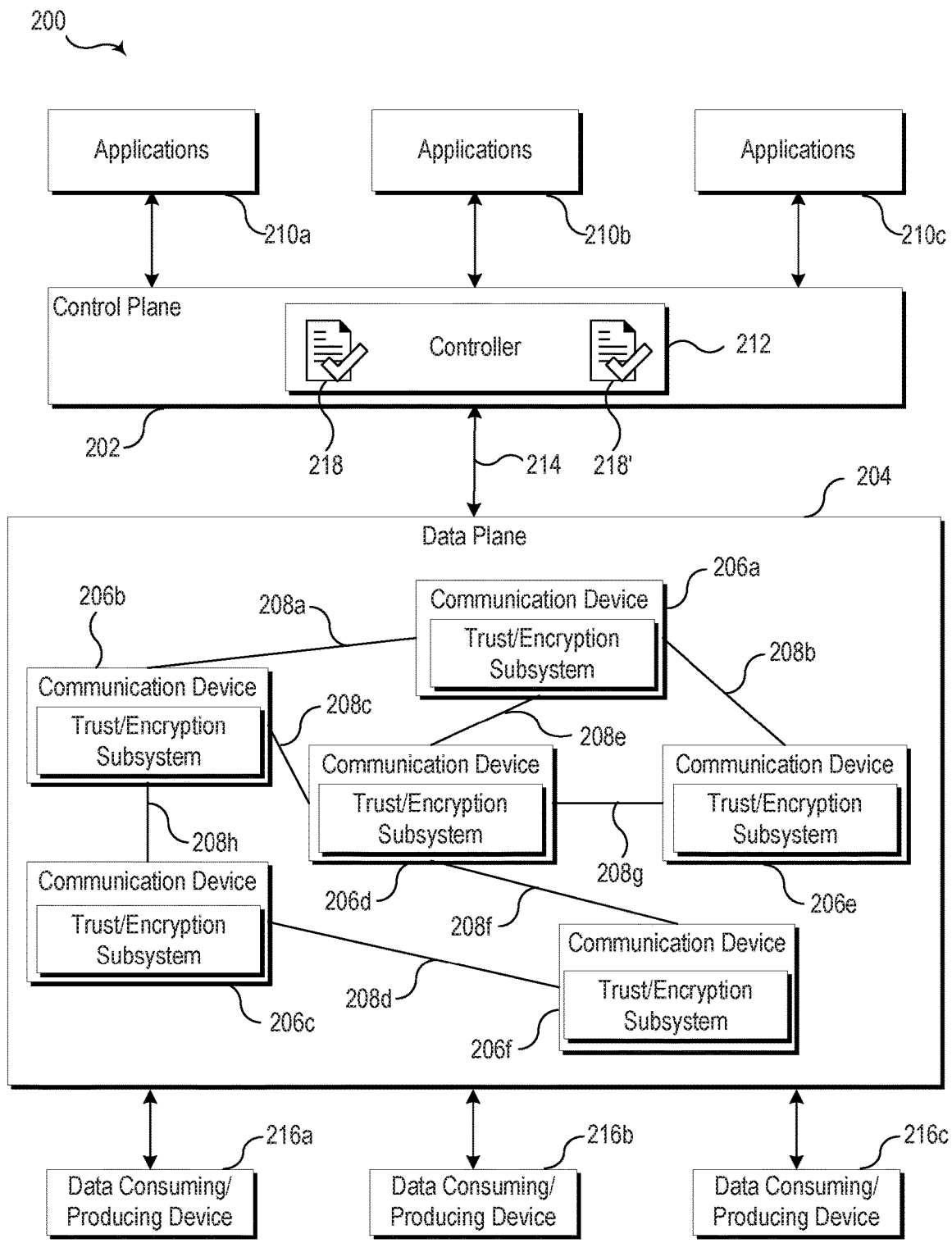
FIG. 2 illustrates a conceptual representation of a SDN architecture including a control plane, a data plane, and a plurality of data consumers/producer devices that may be deployed in an electric power transmission and distribution system consistent with embodiments of the present disclosure.

FIG. 2 illustrates a conceptual representation of a SDN 200 including a control plane 202, a data plane 204, and a plurality of data consumers/producer devices 216a-c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish data flows. The controller may specify rules for routing traffic through the data plane 204 based on a variety of criteria. In some embodiments, applications 210a-210c may be used to configure the control plane 202. Controller 212 may include a primary signing certificate 218 and a secondary signing certificate 218'. Signing certificates 218, 218' may be used to establish trusted relationships with other devices in SDN 200. In various embodiments, trusted credentials may be generated that rely on the primary signing certificate 218 and/or the secondary signing certificate 218'. The trusted credentials may be distributed throughout system 200 to establish trust among various devices.

As illustrated, the data plane 204 includes a plurality of communication devices 206a-206f in communication with one another via a plurality of physical links 208a-208h. In various embodiments, the communication devices 206a-206f may be embodied as switches, multiplexers, and other types of communication devices. The physical links 208a-208h may be embodied as Ethernet, fiber optic, and other forms of data communication channels. As illustrated, the physical links 208a-208h between the communication devices 206a-206f may provide redundant connections such that a failure of one of the physical links 208a-208h is incapable of completely blocking communication with an affected communication device. In some embodiments, the physical links 208a-208h may provide an N−1 redundancy or better.

The data consuming/producing devices 216a-c may represent a variety of devices within an electric power transmission and distribution system that produce or consume data. For example, data consuming/producing devices may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 204 using a plurality of data flows implemented by controller 212. Of course, data consuming/producing devices 216a-c may be embodied by a wide range of devices consistent with embodiments of the present disclosure.

The plurality of communication devices 206a-206f may each include a trust/encryption subsystem that secure communications among devices in the data pane 204. In various embodiments, the trust/encryption subsystem may be issued one or more certificates by controller 212. The one or more certificates may be used to encrypt data traffic sent or received by a particular device. Further, the trust/encryption subsystem may be configured to verify the identity of a sender of SDN data. In one embodiment, the verification may be based on the signing certificates 218 and 218'.

When data is received from data consuming/producing device 216a, the encryption subsystem of one of the plurality of communication devices 206a-206f may encrypt the data before forwarding the data on to another communication device. The final communication device to receive the data prior to transmission to data consuming/producing device 216c may decrypt the data. Accordingly, the encryption and decryption of the data transmitted between data consuming/producing devices 216a and 216c may be transparent to the devices. In other words, the entire encryption and decryption process of the selected data flow may be performed by the plurality of communication devices 206a-206f without involving data consuming/producing devices 216a-c. In various embodiments, the systems and methods disclosed herein may be used to implement end-to-end encryption between a data producing device and a data consuming device that lack encryption capabilities.

Figure 3:
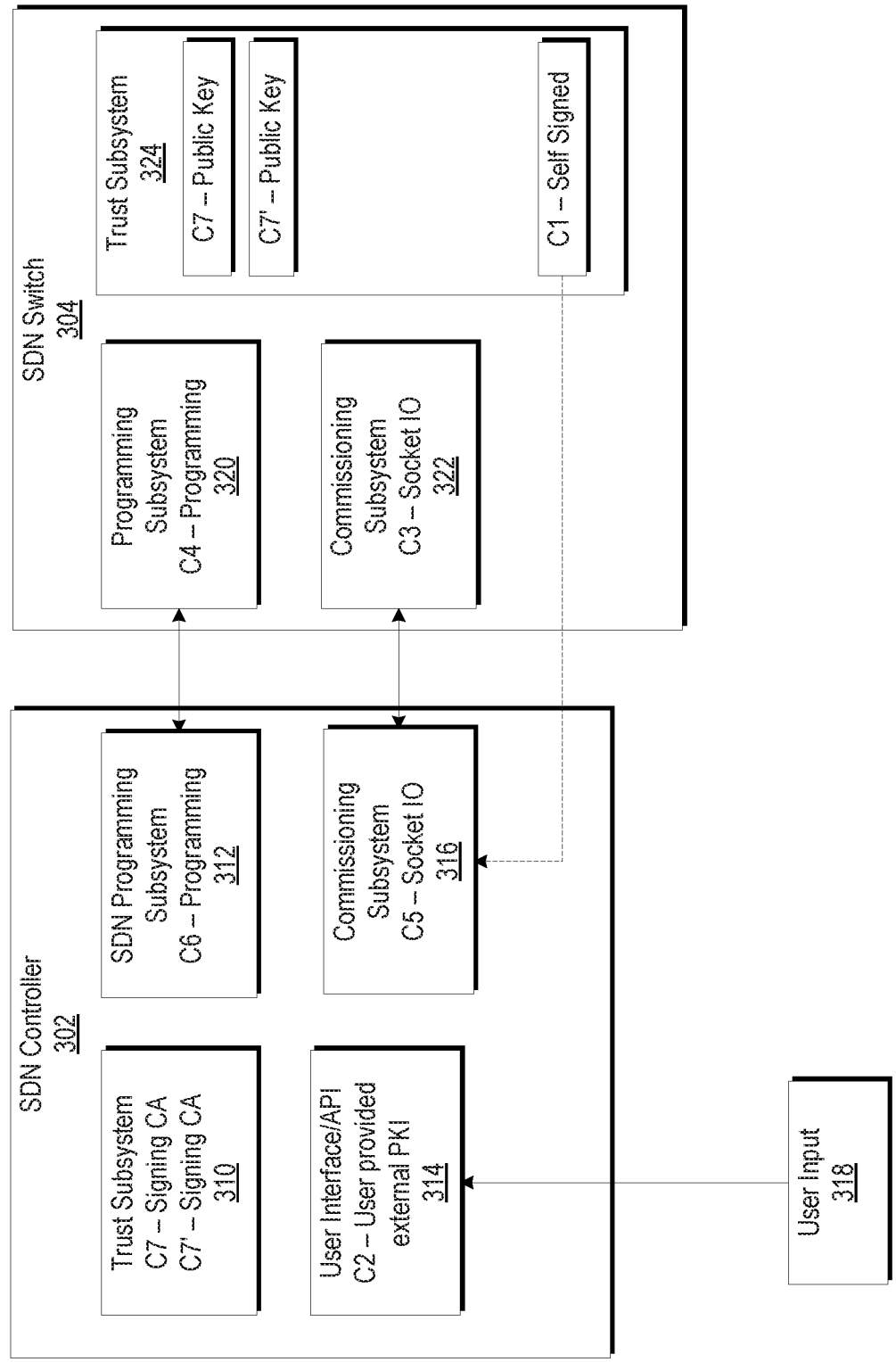
FIG. 3 illustrates a conceptual representation of an establishing of a trust relationship between a SDN controller and a SDN switch consistent with embodiments of the present disclosure.

FIG. 3 illustrates a conceptual representation of an establishing of a trust relationship between a SDN controller 302 and a SDN switch 304 consistent with embodiments of the present disclosure. SDN switch 304 may represent a new device connected to the SDN controlled by SDN controller 302. SDN controller 302 acts as a trust authority or root of trust in a PKI configuration. In the illustrated embodiment, a trust subsystem 310 of the SDN controller 302 has two signing x.509 certificates, C7 and C7'. The source of the certificates C7 and C7' may be internally signed, or may be provided by an external PKI. Although the illustrated embodiment includes two signing certificates, other embodiments may include only one signing certificate. As discussed in greater detail in connection with FIG. 5, in the event that one of the signing certificates is compromised, the other signing certificate may be used to reestablish trust among devices.

In various embodiments, SDN controller 302 may issue certificates to internal components, such as SDN programming subsystem 312 and commissioning subsystem 316. In the illustrated embodiment, C6 is issued to SDN programming subsystem 312 and C5 may be issued to commissioning subsystem 316.

A commissioning subsystem 322 of the SDN switch 304 may be configured to identify SDN switch 304 to SDN controller 302. In the illustrated embodiment, the commissioning subsystem is configured to present a self-signed certificate C1 to a commissioning subsystem 316. In one specific embodiment, a manufacturer may issue certificate C1 to devices in an initial configuration. Certificate C1 may signal to SDN controller 302 that SDN switch 304 is in a factory configured state, and thus does not pose a security threat to the network. Certificate C1 may be removed from SDN switch 304 after the device has been commissioned by SDN controller 302. Once certificate C1 is removed from SDN switch 304, a factory reset may be required before the SDN switch 304 may be commissioned by a different controller. In various embodiments, SDN controller 302 may utilize other techniques to identify new devices.

Once SDN switch 304 is presented for commissioning, SDN controller 302 may be configured to obtain user input 318 to confirm whether the device should be commissioned and admitted to the network. The user input 318 may be received through a user interface/API 314. In some embodiments, a certificate C2 may be used to authenticate and/or secure communications with the user. Upon receipt of user input confirming admission of the device to the network, a trust relationship may be established between controller 302 and SDN switch 304. The trust relationship may be established by providing the public keys of signing certificate C7 and C7' to a trust subsystem 324 of the SDN switch 304. The public keys of signing certificates C7 and C7' may be used to verify communications and commands from SDN controller 302. Further, the signing certificates may be used to create or verify other trusted credentials, such as certificates C3-C6. One specific method for establishing a trust relationship is illustrated in FIG. 4; however, a variety of other methods are contemplated by the present disclosure.

Returning to a discussion of FIG. 3, a SDN programming subsystem 312 may be configured to interact with a programming subsystem 320 of the SDN switch 304. The programming subsystem may receive communication flows, routing instructions, or other information to enable the SDN switch 304 to communicate with other devices in the network. The programming of SDN switch 304 may be modified by SDN programming subsystem 312 over time based on conditions of the network. For example, if a physical link in the SDN fails, the communication flows may be rerouted around the failed link by communicating new communication flows to the programming subsystem 320.

Figure 4:
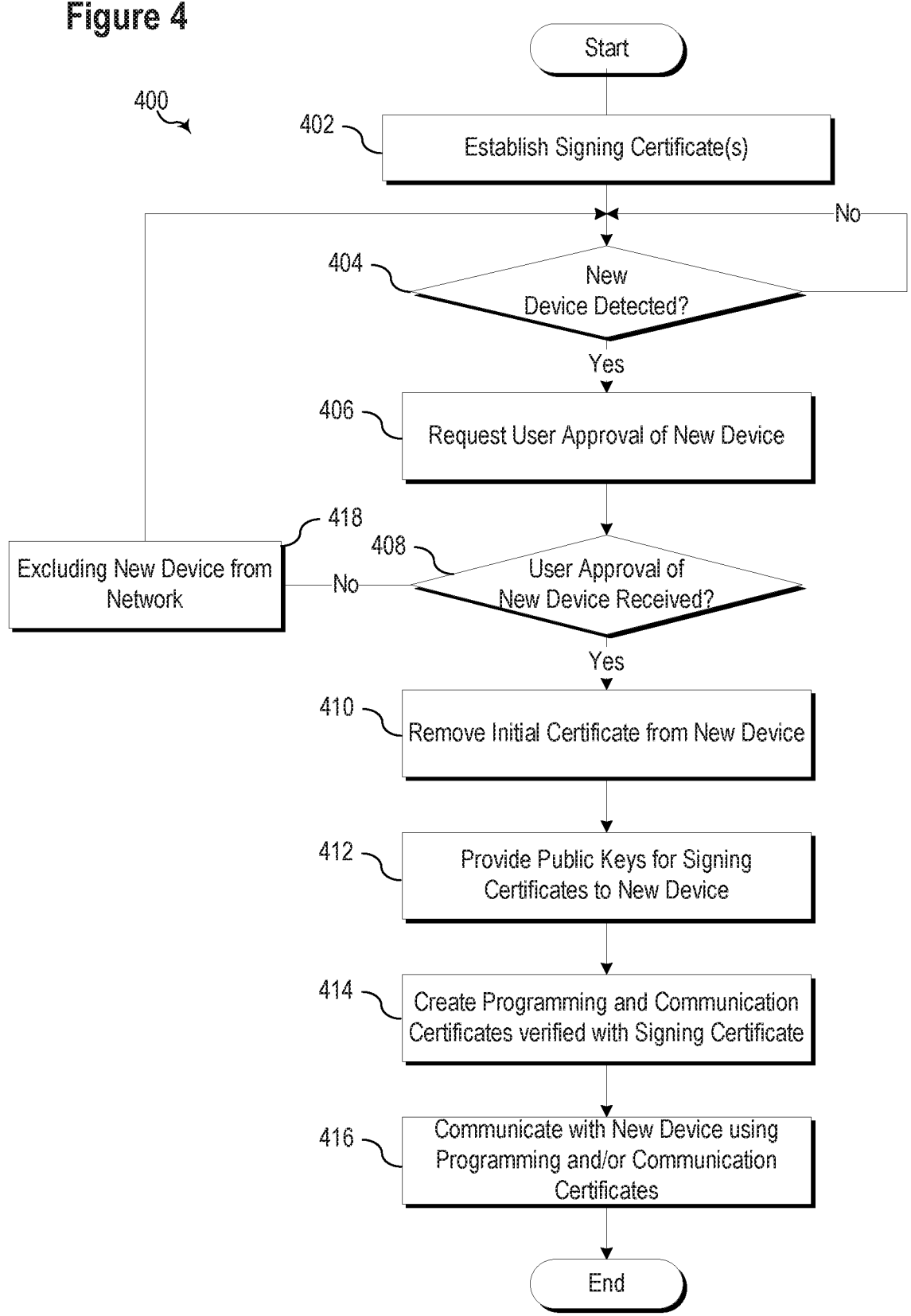
FIG. 4 illustrates a flow chart of a method for establishing a trusted relationship in a SDN between a controller and a network device consistent with embodiments of the present disclosure.

FIG. 4 illustrates a flow chart of a method 400 for establishing a trust relationship in a SDN between a SDN controller and a new network device consistent with embodiments of the present disclosure. At 402, one or more signing certificates may be established for the SDN controller. In various embodiments, the signing certificates may comprise x.509 certificates for use in a PKI system. In some embodiments, two or more signing certificates may be established. Multiple certificates may be utilized in a scenario in which one signing certificate is compromised to reestablish trust with devices in the SDN.

At 404, method 400 may determine if a new device is detected. Detection of a new device may be performed using a variety of techniques. In various embodiments, the new device may initiate communication with the SDN controller. In other embodiments, the new device may be detected using network discovery techniques. Upon detection of a new device, method 400 may progress to 406. In the illustrated embodiment, a new device may initiate communication with a SDN controller using an initial certificate. The initial certificate may be provided by a manufacturer, and may indicate that the new device is in a factory-configured state.

At 406, user approval of the new device may be requested. User approval may be provided in a variety of ways and using a variety of systems. For example, a user may provide confirmation of a new device via a human-machine interface of an IED, via a local interface, via a remote terminal, etc. Requesting user confirmation prior to permitting the new device to join the network may help to ensure that rogue devices are not permitted to join the network or obtain access to information transmitted via the network.

At 408, method 400 may determine whether user confirmation of the new device has been received. In the event that user authorization is not received, the detected device may be excluded from the network at 418. In some embodiments, the SDN controller may implement data flows around the new device, may add the new device to a blacklist, or may take other actions to isolate the new device from the network.

At 410, an initial certificate may be removed from the new device. As described in connection with FIG. 3, an initial certificate may be created by a manufacturer. Such a certificate may indicate in some embodiments that the new device is in a factory-configured state. In other embodiments, the device may generate a self-signed certificate, or may initiate communications with the SDN controller without a certificate.

Returning to a discussion of FIG. 4, the public keys for the signing certificates of the SDN controller may be provided at 412. The signing certificates may provide a basis for establishing a trust relationship between the SDN controller and the new device. The signing certificates may be used to verify that the messages and/or instructions originate from the SDN controller.

At 414, programming and communication certificates may be created and verified with the signing certificates issued by the SDN controller. In various embodiments, programming and/or communication certificates may be issued to the new device by the SDN controller. In one specific embodiment, a TLS connection may be used by the SDN controller for issuing programming and communication certificates for use by the new device.

At 416, communications with the new device may begin using the programming and/or communication certificates. Using the programming certificate, a secure communication channel between the SDN controller and the new device may be used to create and modify data flows through the network. Such data flows may affect the physical links used to transmit data through the network. The communication certificate may be used to securely communicate data in the network. In some embodiments the communication certificate may comprise encryption keys used to encrypt data transmitted by the new device.

Figure 5:
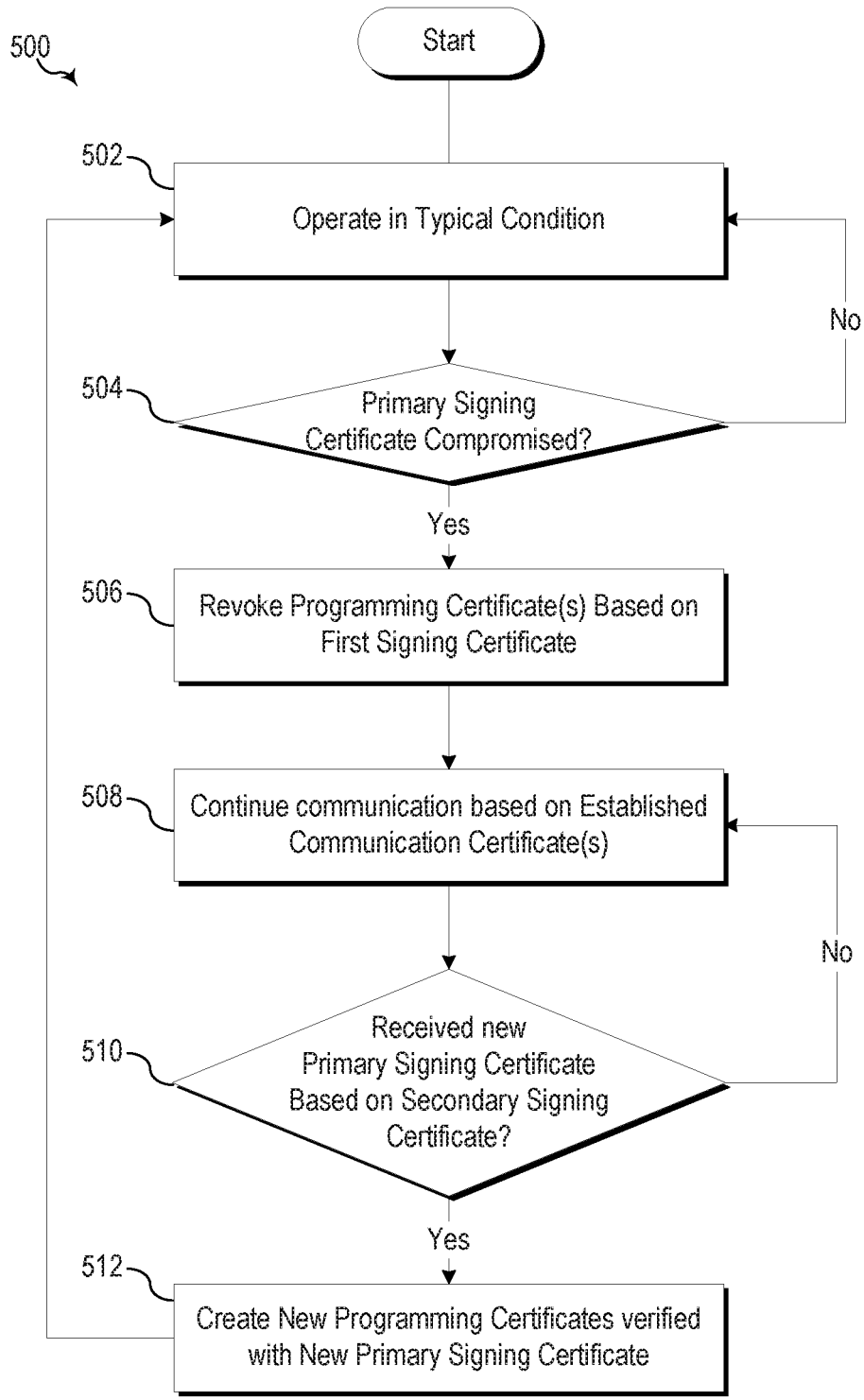
FIG. 5 illustrates a flow chart of a method for reestablishing a trusted relationship in a SDN between a controller and a network device after a primary signing certificate is compromised consistent with embodiments of the present disclosure.

FIG. 5 illustrates a flow chart of a method 500 for reestablishing a trusted relationship in a SDN between a controller and a network device after a primary signing certificate is compromised consistent with embodiments of the present disclosure. At 502, a SDN may operate in a typical condition, in which communications and programming channels are operational. At 504, method 500 may determine whether a primary signing certificate is compromised. A primary signing certificate may become comprised in various ways. For example, a security vulnerability in a communication protocol may allow an attacker to discover the private key associated with the certificate. In this example, the use of a secondary certificate for communication for a different protocol may decrease the risk of all the certificates being compromised through a vulnerability in a protocol. In another example, the physical security of a device (e.g., a computer-readable storage medium used to distribute keys used to distribute keys to the controller, etc.) may be compromised. The risk associated with this example may be mitigated by using distinct physical media to distribute each certificate.

At 506, one or more programming certificates based on the first signing certificate may be revoked. Revoking the programming certificates may disable programming changes in the network. As such, the network may maintain an established configuration. By maintaining the established configuration new devices, which may not be trusted, may be excluded from the network.

At 508, communications may be continued based on established communication certificates. Maintaining communication may permit the network to continue its operation. Continuing operation in an established configuration may be desirable, particularly where the network supports the operation of critical infrastructure, such as an electric power transmission and distribution system.

At 510, method 500 may determine whether a new primary signing certificate has been received based on a secondary signing certificate. The public key associated with a secondary certificate may have been provided to a plurality of devices in the network. In some embodiments, the primary certificate may be distributed at the same time of the secondary certificate. Alternatively, the primary certificate may be distributed at a different time from the secondary certificate. In either case, devices in the network may rely on the secondary signing certificate to create new programming certificates at 512. The new programming certificates may be verified with the primary signing certificate.

Figure 6:
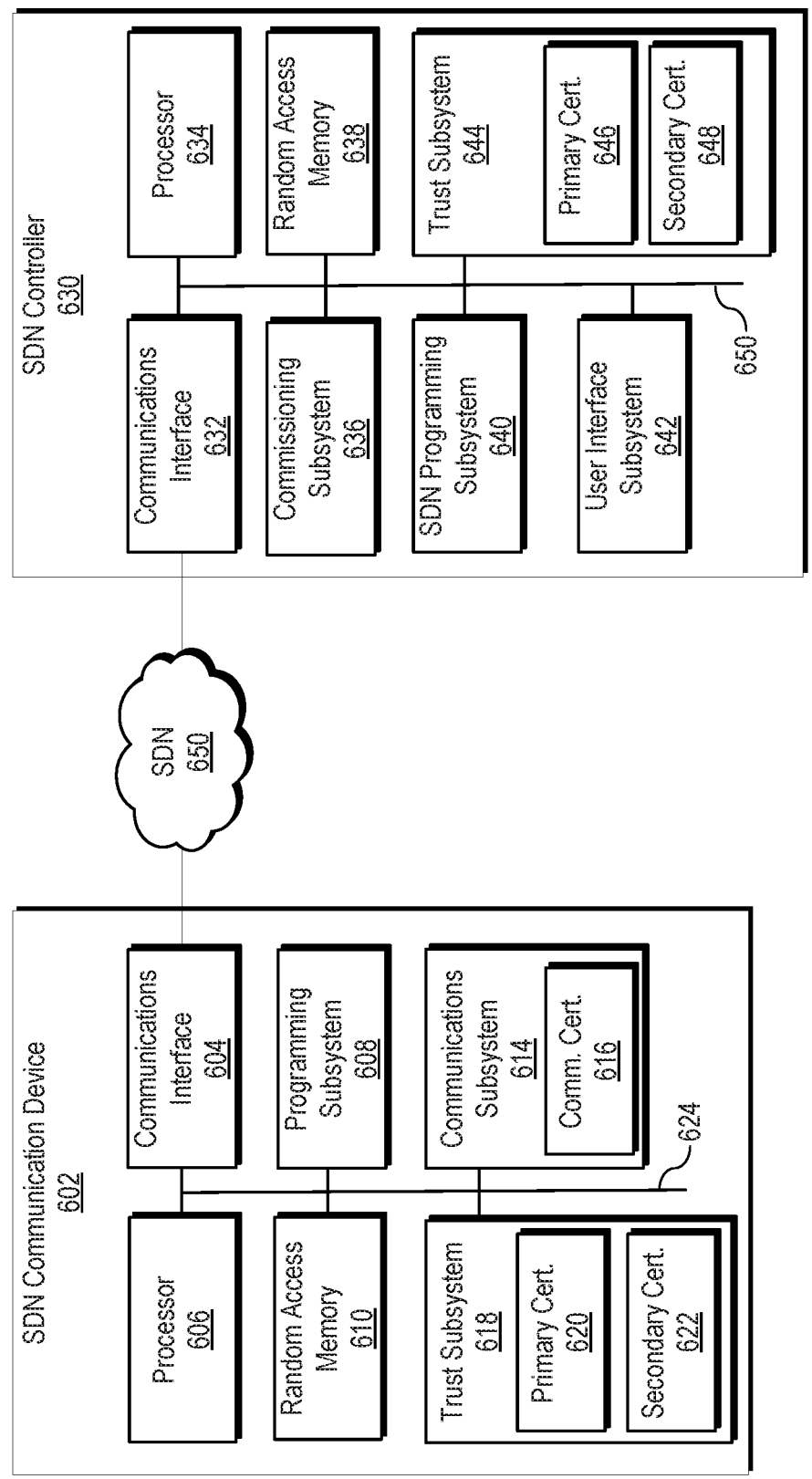
FIG. 6 illustrates a functional block diagram of a communication device configured to encrypt or decrypt data packet payloads of selected data flows consistent with embodiments of the present disclosure.

FIG. 6 illustrates a functional block diagram of a system 600 including a SDN communication device 602 and a SDN controller 630 configured to implement a trusted relationship in a SDN consistent with embodiments of the present disclosure. In some embodiments, SDN communication device 602 and SDN controller 630 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

Communication device 602 and SDN controller 630 each include a communications interface 604 and 632, respectively. Communications interfaces 604 and 632 may each be in communication with SDN 650. Data busses 624 and 650 may facilitate communication among various components of the SDN communication device 602 and the SDN controller 630, respectively.

Processors 606 and 634 may be configured to process communications and to coordinate the operation of the other components of the SDN communication device 620 and the SDN controller 630, respectively. Processors 606 and 632 may operate using any number of processing rates and architectures. Processors 606 and 632 may be configured to perform any of the various algorithms and calculations described herein. Processor 606 may be embodied as a general purpose integrated circuit, an application specific integrated circuit, a field-programmable gate array, and/or any other suitable programmable logic device. Instructions to be executed by processors 606 and 634 may be stored in random access memory 610 (RAM) and 638, respectively.

A commissioning subsystem 636 may be configured to commission SDN communication device 602 when the device is initially connected to SDN 650. Commissioning subsystem 636 may specifically be configured to establish a trust relationship between SDN controller 630 and SDN communication device 602. In one embodiment, the commissioning subsystem 636 may interact with the trust systems 618 and 644 to transmit the public keys of primary certificate 620 and a secondary certificate 622 to the SDN communication device 602. These credentials may be used to verify communications originating from SDN controller 630. In various embodiments, SDN communication device 602 and SDN controller 630 may be configured to implement the methods illustrated in FIGS. 4 and 5.

Returning to a discussion of FIG. 6, SDN programming subsystem 640 may operate in conjunction with programming subsystem 608 to program the SDN communication device 602 to communicate with other devices (not shown) connected to SDN 650. The programming subsystem 608 may receive data flows from SDN programming subsystem 640. The data flows may be modified by SDN programming subsystem 640 based on conditions of the network. In some embodiments, programming instructions transmitted from SDN controller 630 may be signed by SDN controller 630. In some embodiments, the programming instructions may be signed using a primary certificate 646 or a secondary certificate 648, while in other embodiments a programming certificate may be generated. In the event that the primary certificate 646 is compromised, trust may be reestablished using the secondary certificate 648.

A communication subsystem 614 may be configured to route data communications through SDN 650 based on the data flows managed by programming subsystem 608. In some embodiments, a communications certificate 616 may be used to encrypt or authenticate data transmitted by SDN communication device 602.

A user interface subsystem 642 may be configured to receive user approval of newly detected devices in SDN 650. In various embodiments, user approval may be required before communication with a new device is permitted. Until communication is enabled by user approval, the new device may be excluded from communications within the SDN. Such exclusion may be achieved by routing data flows around the new device, blacklisting the new device, etc.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A software defined network (SDN) controller, the SDN controller comprising:
   a communications interface configured to communicate with a plurality of SDN network devices;
   a memory;
   a processor operatively coupled to the memory, wherein the processor is configured to execute instructions stored on the memory to cause the processor to:
      detect a new device associated with the SDN based on receipt of an initial certificate indicating that the new device is in a factory configured state;
      receive a user approval to commission the new device;
      establish a first SDN controller trusted credential;
      transmit a first device trusted credential based on the first SDN controller credential to the new device;
      issue programming instructions to the new device authenticated using the first SDN controller trusted credential; and
      remove the initial certificate from the new device upon receiving the user approval to commission the new device onto the SDN to require a factory reset to recommission the new device to a different SDN controller.

2. The SDN controller of claim 1, wherein the first SDN controller trusted credential comprises a Public Key Infrastructure (PKI) certificate.

3. The SDN controller of claim 2, wherein the first device trusted credential comprises a public key of the PKI certificate.

4. The SDN controller of claim 1, wherein the processor is configured to create a communication certificate configured to encrypt communications transmitted by the new device.

5. The SDN controller of claim 1, wherein the processor is configured to:
   establish a second SDN controller trusted credential; and
   transmit a second device trusted credential based on the second SDN controller credential to the new device.

6. The SDN controller of claim 5, wherein the processor is further configured to:
- determine that the first SDN controller trusted credential is compromised;
- revoke the first device trusted credential; and
- establish a second device trusted credential based on the second SDN controller credential.

7. The SDN controller of claim 1, wherein the processor is configured to prevent commissioning of the new device until the user approval is received.

8. The SDN controller of claim 1, wherein the processor is configured to execute instructions stored on the memory to cause the processor to provide routing instructions to enable the new device to communicate with other devices on the SDN.

9. The SDN controller of claim 1, wherein the processor is configured to execute instructions stored on the memory to cause the processor to modify the programming instructions over time based on conditions of the SDN.

10. The SDN controller of claim 1, wherein the processor is configured to execute instructions stored on the memory to cause the processor to reroute communication flow around a physical link by communicating new communication flows to the new device.

11. A method for implementing a trusted relationship in a software defined network (SDN), comprising:
- establishing a first SDN controller trusted credential;
- detecting a new device associated with the SDN based on receipt of an initial certificate indicating that the new device is in a factory configured state;
- receiving user approval to commission the new device;
- transmitting a first device trusted credential based on the first SDN controller credential to the new device;
- issuing programming instructions to the new device, the programming instructions comprising authentication information based on the first SDN controller trusted credential; and
- removing the initial certificate from the new device upon receiving the user approval to commission the new device onto the SDN to require a factory reset to recommission the new device to a different SDN controller.

12. The method of claim 11, wherein the first trusted credential comprises a Public Key Infrastructure (PKI) certificate.

13. The method of claim 12, wherein the trusted credential comprises a public key of the PKI certificate.

14. The method of claim 11, further comprising:
- creating a communication certificate for use by the new device;
- encrypting communications transmitted by the new device using the communication certificate.

15. The method of claim 11, further comprising:
- establishing a second SDN controller trusted credential; and
- transmitting a second device trusted credential based on the second SDN controller credential to the new device.

16. The method of claim 15, further comprising:
- determining that the first SDN controller trusted credential is compromised;
- revoking the first device programming credential; and
- establishing a second device programming credential based on the second trusted credential.

17. The method of claim 16, further comprising:
- continuing communication among a plurality of devices in the SDN following revoking the first device programming credential.

18. The method of claim 11, comprising providing routing instructions to enable the new device to communicate with other devices on the SDN.

19. The method of claim 11, comprising modifying the programming instructions over time based on conditions of the SDN.

20. The method of claim 11, comprising rerouting communication flow around a physical link by communicating new communication flows to the new device.

* * * * *